United States Patent [19]
Walley et al.

[11] Patent Number: 6,049,478
[45] Date of Patent: Apr. 11, 2000

[54] DIGITAL MAGNETIC READ CHANNEL AND METHOD

[75] Inventors: Thomas M Walley, Loveland; Jacob L. Bell; William L. Pherigo, Jr., both of Ft. Collins, all of Colo.

[73] Assignee: Hewlett Packard Company, Palo Alto, Calif.

[21] Appl. No.: 09/262,405

[22] Filed: Mar. 4, 1999

[51] Int. Cl.[7] .................................................. G11C 7/00
[52] U.S. Cl. ........................................... 365/171; 365/173
[58] Field of Search ............................... 365/171, 189.04, 365/230.01, 173

[56] References Cited

U.S. PATENT DOCUMENTS

5,991,193  11/1999  Gallagher et al. ....................... 365/171

*Primary Examiner*—Terrell W. Fears

[57] ABSTRACT

Disclosed is a system and method for generating a data sequence from a two frequency coherent phase signal. The system comprises an integrated magnetic read channel that includes a magnetic reader circuit configured to generate an analog two frequency coherent phase (F2F) signal from a magnetic strip, the analog F2F signal having a number of alternating positive and negative peaks having a respective positive and negative transitions therebetween. The output of the magnetic reader circuit is applied to an analog-to-digital converter configured to convert the analog F2F signal into a digital F2F signal. Thereafter, the digital F2F signal is applied to a peak detector configured to identify the alternating negative and positive peaks. The magnetic read channel also includes a transition calculator configured to determine a transition time between each of the consecutively positioned alternating positive and negative peaks, and a frequency locked loop configured to determine a transition type for each of the transition times. Finally, the output of the frequency locked loop is applied to a data separator configured to determine a data value from the transition types.

18 Claims, 7 Drawing Sheets

DIGITAL MAGNETIC READ CHANNEL AND METHOD

TECHNICAL FIELD

The present invention is generally related to a system and method for acquiring data from a two frequency coherent phase signal and, more particularly, is related to a system and method for acquiring said data using peak detection.

BACKGROUND OF THE INVENTION

Magnetic strips are used on many surfaces such as credit cards and the like to store data information related to anything from bank account information to security access codes. Such information is generally a predetermined sequence of digital zeros and ones which are read by a magnetic read head. The signals generated by the magnetic read head are deciphered and the data information encoded therein is determined.

Conventional systems and methods to determine the data held by the two frequency coherent phase signal held within magnetic strips are not without problems. Commonly, the two frequency coherent phase signal comprises a number of negative and positive transitions that oscillate above and below a predetermined centerline forming a number of consecutive positive and negative peaks. The actual data is represented by the zero crossings of the two frequency coherent phase signal where a signal zero crossing within a predetermined time period represents a logical zero, and two zero crossings within the same predetermined time period indicates a logical one. It is often the case, however, that the magnitude of the negative and positive peaks are diminished due to wear and tear on the magnetic strip, as well as exposure to extraneous magnetic fields that change the nature of the two frequency coherent phase signal. Also, sometimes a particular positive or negative transition may develop a "hook and shelf" waveform that often times causes the interpreting systems to believe there are extra zero crossings resulting in error. The waveform can also vary based on the magnetic material of the magnetic strip and the swipe speed.

SUMMARY OF THE INVENTION

In light of the foregoing, the present invention provides a system and method for generating a data sequence from a two frequency coherent phase signal that avoids the above noted problems. According to the system of the present invention, an integrated magnetic read channel is provided which comprises a magnetic reader circuit configured to generate an analog two frequency coherent phase (F2F) signal from a magnetic strip, the analog F2F signal having a number of alternating positive and negative peaks having a respective positive and negative transitions therebetween. The output of the magnetic reader circuit is applied to an analog-to-digital converter configured to convert the analog F2F signal into an oversampled digital F2F signal. Thereafter, the digital F2F signal is applied to a peak detector configured to identify the alternating negative and positive peaks. The magnetic read channel also includes a transition calculator configured to determine a transition time between each of the consecutively positioned alternating positive and negative peaks, and a frequency locked loop configured to determine a transition type for each of the transition times. Finally, the output of the frequency locked loop is applied to a data separator configured to determine a data value from the transition types.

The present invention may also be broadly viewed as a method for determining a transition type in a digital two frequency coherent phase (F2F) signal, comprising the steps of: identifying a number of alternating negative and positive peaks in the two frequency coherent phase signal: determining a transition time between the alternating positive and negative peaks; determining a transition type for each of the transition times; and, determining a data value from the transition types.

The present invention provides numerous advantages, some of which are listed herein as examples, including a low error rate due to hook and shelf waveforms and an adaptive system that compensates for diminished magnetic signals on the magnetic strips.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
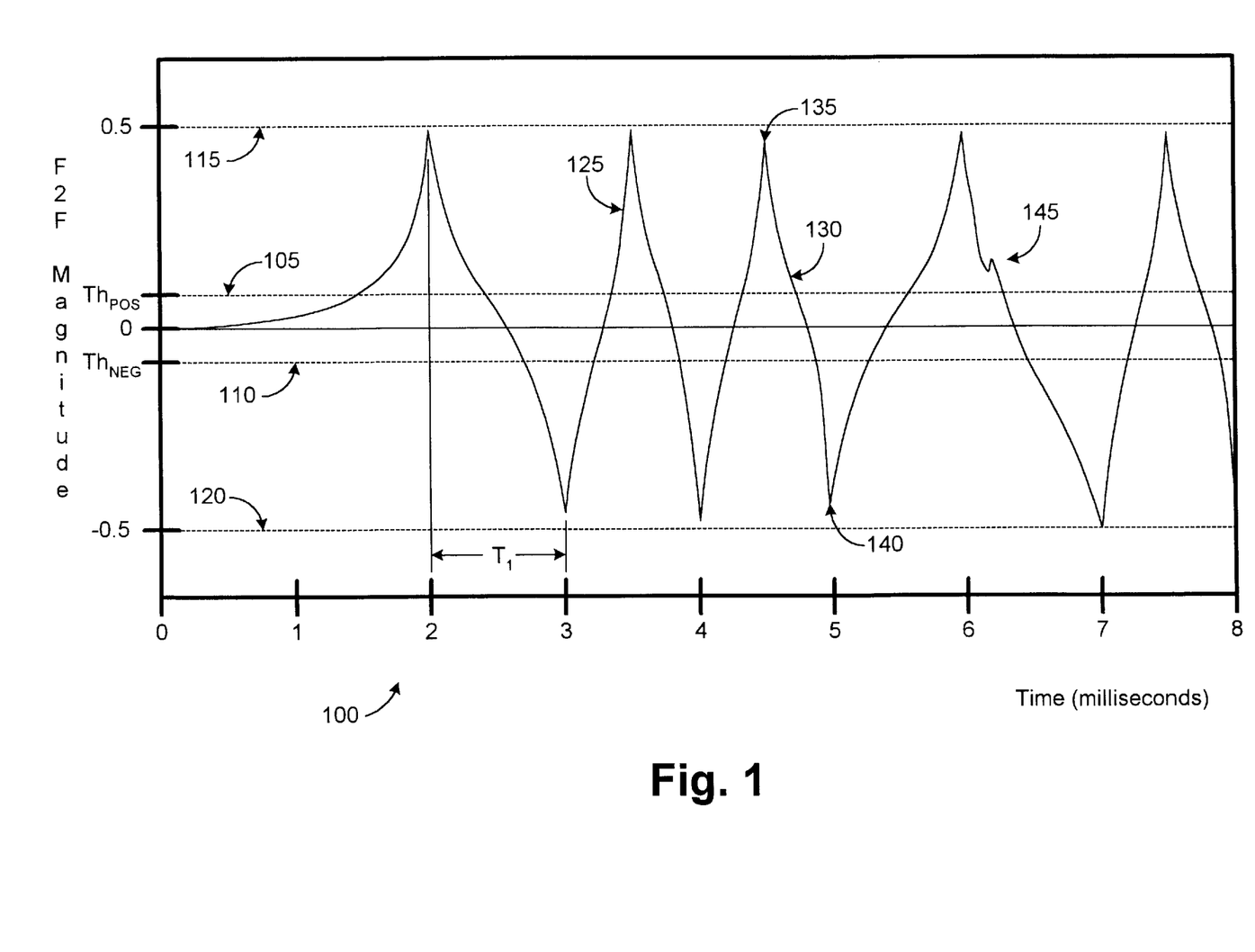
FIG. 1 is a graph of the magnitude of a two frequency coherent phase signal according to the prior art.

Turning to FIG. 1, shown is a graph of the magnitude of a two frequency coherent phase signal 100 with respect to time that is similar to those commonly found on magnetic stripes of credit cards. The graph of the two frequency coherent phase signal 100 includes a positive zero threshold 105 above zero and a negative zero threshold 110 below zero. The graph also includes a positive gain target 115 and a negative gain target 120 that indicate an upper and lower magnitude of the two frequency coherent phase signal 100.

The two frequency coherent phase signal 100 includes a number of positive transitions 125 and negative transitions 130. Consecutive positive and negative transitions 125 and 130 form a number of positive and negative peaks 135 and 140. The two frequency coherent phase signal 100 is divided into a number of time periods $T_1$, each of the time periods $T_1$ representing a particular data bit of a number stored in the two frequency coherent phase signal 100. Each of the data bits may be a logical zero or a logical one. A logical zero is represented by a single transition, negative or positive, within the entire time period $T_1$. A logical one is represented by two transitions, negative or positive, within the entire time period $T_1$. The transitions that indicate a logical zero may be either a positive transition 125 or a negative transition 130. A logical one may be represented by either a positive transition 125 then a negative transition 130, or vice versa.

Note that the two frequency coherent phase signal 100 may include imperfections such as a hook and shelf waveform 145. In addition, the positive and negative peaks 135 and 140 do not always reach the positive gain target 115 and the negative gain target 120, respectively. These imperfections and others may ultimately result in errors when conventional card readers read the two frequency coherent phase signal 100.

Figure 2:
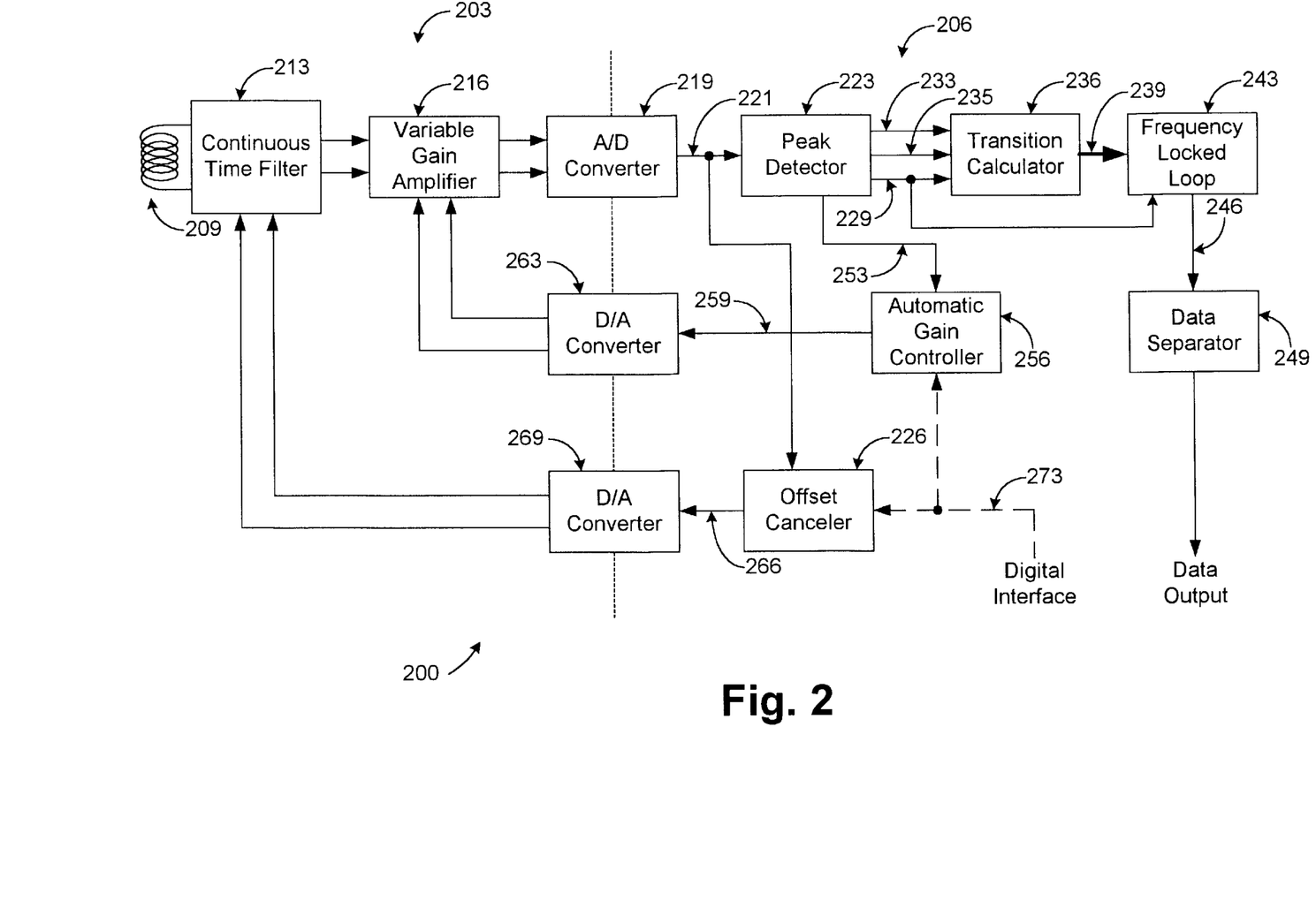
FIG. 2 is a functional block diagram of a magnetic read channel according to an embodiment of the present invention.

With reference to FIG. 2, shown is a functional block diagram of a magnetic read channel 200 according to an embodiment of the present invention. The magnetic read channel 200 includes an analog portion 203 and a digital portion 206. The analog portion includes a magnetic read head 209 that generates a two frequency coherent phase signal 100 when a magnetic strip is run therethrough. The two frequency coherent phase signal 100 generated by the magnetic read head 209 is applied to a continuous time filter 213 and then to a variable gain amplifier 216 in a balanced configuration. The output of the variable gain amplifier 216 is applied to an analog-to-digital converter 219 via a balanced circuit configuration as well.

The output of the A/D converter 219 is a digital two frequency coherent phase signal 221 comprised of a number of samples taken at a predetermined sample rate. The actual sample rate chosen is preferably much higher than the Nyquist frequency depending on the particular application. This digital F2F signal 221 is applied to both a peak detector 223 and an offset canceler 226. The peak detector circuit 223 receives the digital F2F signal 221 and generates a "zero crossing" signal 229, a "more positive" signal 233, and a "more negative" signal 235 based on the digital F2F signal 221. The zero crossing signal 229, more positive signal 233, and the more negative signal 226 are thereafter applied to a transition calculator 236. The transition calculator 236 determines a transition time 239 between consecutive positive and negative peaks 135 and 140 (FIG. 1) and vice versa in the digital F2F signal 221.

The transition time 239 determined by the transition calculator 236 is applied to a frequency locked loop 243 which generates a transition type 246 for each positive and negative transition 125 and 130. The transition type 246 indicates whether a particular transition is one of two transitions within a single time period $T_1$ indicating a logical one, or a single transition within the single time period $T_1$ indicating a logical zero. The transition calculator also receives the zero crossing signal 229 as a synch input. The transition type 246 from the frequency locked loop 243 is applied to a data separator 249 which generates a stream of logical zeros or logical ones which comprise the data information stored on the magnetic strip used by further data processing equipment depending on the particular application. The data separator 249 also generates a synch signal that pulses high when a new data bit is valid. This synch signal could be used as a clock signal as it pulse at the incoming data rate.

The peak detector 223 also generates a peak magnitude output 253 that is applied thereafter to an automatic gain controller 256. The peak magnitude output 253 may be either the magnitude of the positive peaks 135 or the negative peaks 140. The automatic gain controller 256 generates an output signal 259 that indicates a level of amplification that is needed to ensure that the magnitude of the negative and positive peaks 135 and 140 approximately equals the positive and negative gain targets 115 and 120. The output signal 259 is applied to a digital-to-analog converter 263, and thereafter to the variable gain amplifier 216 using a balanced circuit configuration.

The digital F2F signal 221 is applied to the offset canceler 226 that generates an offset signal 266 that is sent to a D/A converter 269 that in turn applies the process signal 266 to the continuous time filter 213 via a balanced circuit configuration. The automatic gain controller 256 may receive a data input from a digital interface 273 from which initial values are obtained or a hardwired initial values may be used. The digital interface 273 may be an interface with a central processing unit or a dedicated logical circuit that generates desired values as will be discussed.

The various components of the magnetic read channel 200 represented by the blocks in the functional block diagram of FIG. 2 can be implemented in hardware, software, firmware, or a combination thereof. In the preferred embodiment(s), the magnetic read channel 200 is implemented in hardware using a logical circuit comprising a number of integrated circuits. However, it is understood the various functions performed in each one of the above functional blocks may be performed by a general processor circuit operating pursuant to a program stored in a memory and that is executed by a suitable instruction execution system with appropriate inputs and outputs. Also, a combination circuit comprising a processor and various integrated circuits may be employed as well.

In addition, for those functions of the present invention implemented in software, such a program comprising an ordered listing of executable instructions for implementing logical functions can be embodied in any computer-readable medium for use by or in connection with an instruction execution system, apparatus, or device. The instruction execution system may include a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 3:
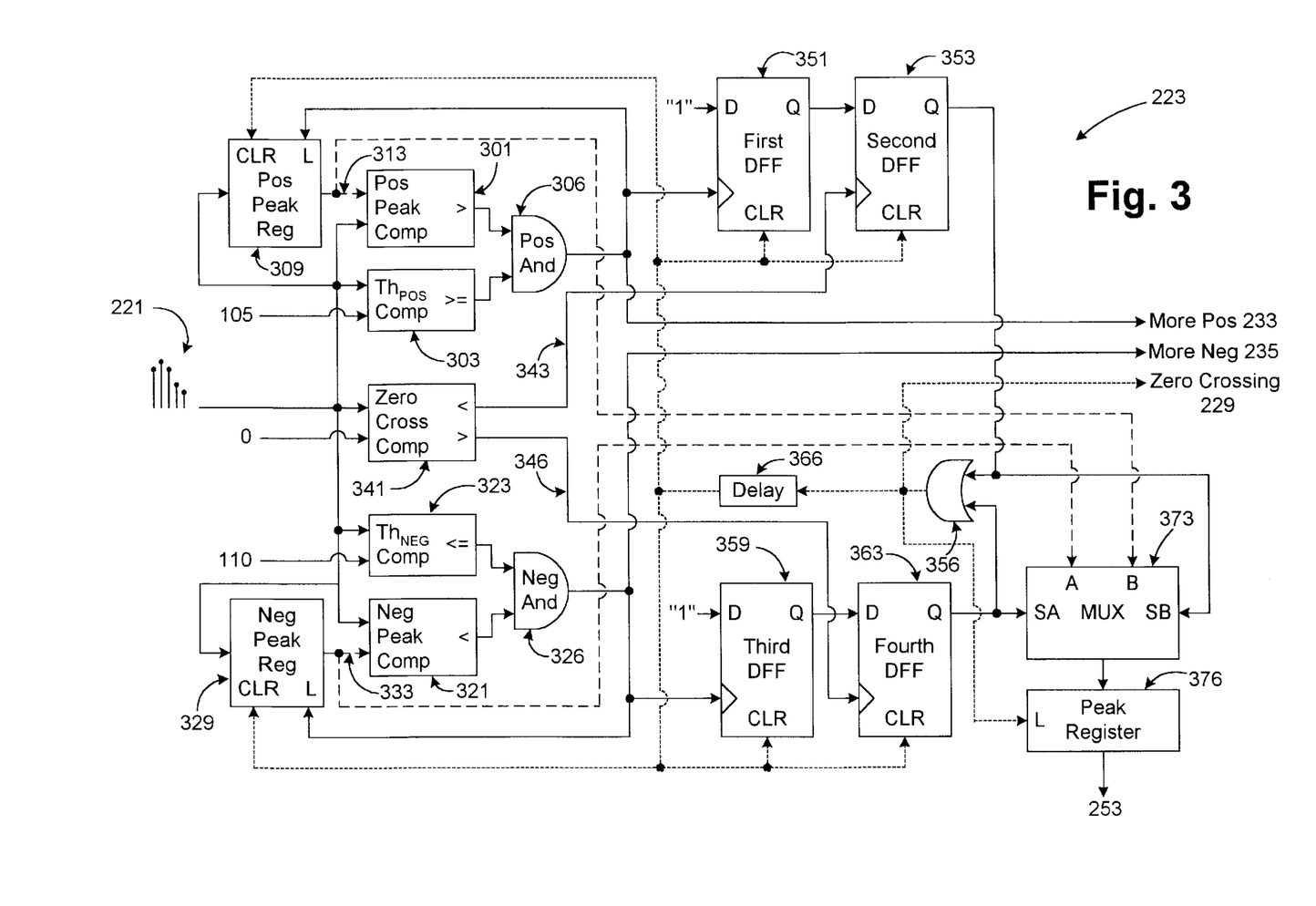
FIG. 3 is a schematic of a peak detector employed by the magnetic read channel of FIG. 2 according to another embodiment of the present invention.

With reference to FIG. 3, shown is a schematic of the peak detector 223 according to an embodiment of the present invention. The peak detector 223 receives the digital F2F signal 221 where it is applied to a positive peak comparator 301 and a positive zero threshold comparator 303. The positive peak comparator 301 and the positive zero threshold comparator 303 both have an output coupled to a positive AND gate 306. The positive AND gate 306 includes an output which is in turn coupled to a latching input L of a positive peak register 309. The positive peak register 309 includes a digital F2F signal input to which the digital F2F signal is applied. The positive peak register 309 also outputs a positive peak value 313 that is applied to the positive peak comparator 301.

The positive peak comparator 301 compares a positive peak value 313 from a positive peak register 309 with a current digital F2F signal value. If the positive peak value 313 is greater than the current digital F2F signal value, then the positive peak comparator 301 outputs a logical one to the positive AND gate 306. In the positive zero threshold comparator 303, the current digital F2F signal value is compared with the positive zero threshold 105. If the current digital F2F signal value is greater than or equal to the positive zero threshold 105 then the positive zero threshold comparator 303 outputs a logical one to the positive AND gate 306. Thus, the positive AND gate 306 generates a logical one at its output when the current sample of the digital F2F signal 121 is both greater than or equal to the positive zero threshold 105 and is greater than the value held in the positive peak register 309. If these conditions are met, then the current sample of the digital F2F signal 121 is latched into the positive peak register 309. This sample of the digital F2F signal 121 is used to compare with the next sample of the digital F2F signal 121 in the positive peak comparator 301.

In this manner, the highest value encountered during a positive transition 125 (FIG. 1) is maintained in the positive peak register 309 until a positive peak register 309 is cleared by a zero crossing signal 229 as will be discussed. Note that the output of the positive AND gate 306 is the more positive signal 223. Thus, the more positive signal 223 will begin to pulse when a positive transition 125 reaches a point above the positive zero threshold 105 until the value of the positive peak 135 is obtained and stored in the positive peak register 309. Consequently, a positive peak 135 is ascertained by detecting a transition reversal from a positive transition 125 to a negative transition 130. This is accomplished in the positive peak comparator 301 when it is determined that a current sample of the digital F2F signal 221 is less than the positive peak value 313 indicating that the positive most point on a particular positive transition 125 has been reached. A subsequent zero crossing confirms that the value held by the positive peak register 309 is actually a peak value as will be discussed.

The peak detector 223 also includes a negative peak comparator 321, a negative threshold comparator 323, a negative AND gate 326, and a negative peak register 329. The negative peak register 329 includes an input that receives samples of the digital F2F signal 221 and outputs a negative peak value 333. Samples of the digital F2F signal 221 are applied to an input of the negative zero threshold comparator 323 and the negative peak comparator 321. Also, the negative zero threshold 110 is applied to a second input of the negative zero threshold comparator 323 and the negative peak value 333 is applied to a second input of the negative peak comparator 321.

If a current sample of the digital F2F signal 221 is less than or equal to the negative zero threshold 110, then the negative zero threshold comparator 323 outputs a logical one that is applied to an input of the negative AND gate 326. Likewise, if the same current sample of the digital F2F signal 221 is less than the negative peak value 333, then the negative peak comparator 321 outputs a logical one that is applied to a second input of the negative AND gate 326. The output of the negative AND gate 326 is applied to a latching input L of the negative peak register 329. Note that the output of the negative AND gate 326 is also the more negative signal 235.

Thus, similar to the discussion of the more positive signal 223 above, when the digital F2F signal 121 undergoes a negative transition 130 and reaches a value below the negative zero threshold 110, the more negative signal 235 begins to pulse. This causes the current samples of the digital F2F signal 121 to be latched into the negative peak register 329. When the negative most sample of the digital F2F signal 121 is latched into the negative peak register 329, the more negative signal 235 stops pulsing. At this time, the value of the negative peak 140 is stored in the negative peak register 329 until the native peak register 329 is cleared as will be discussed. Thus, a negative peak 140 is ascertained by detecting a transition reversal from a negative transition 130 to a positive transition 125. This is accomplished in the negative peak comparator 321 when it is determined that a current sample of the digital F2F signal 221 is greater than the negative peak value 333 indicating that the negative most point on a particular negative transition 130 has been reached.

Note that the accuracy of the location of the positive and negative peaks 135 and 140 depends in part upon the sample frequency of the A/D converter 219. The higher the sample frequency, the greater the accuracy and vice versa as the peak sample is more likely to be near the actual peak of the analog F2F signal. Also, at higher sample frequencies, the accuracy of the location of the positive and negative peaks 135 and 140 is less susceptible to noise in the analog F2F signal.

The peak detector 223 also includes a zero crossing comparator 341 which has a first input to which the digital F2F signal 221 is applied, and a second input to which a zero value is applied. If a current sample of the digital F2F signal 221 is less than the zero value, then a less than zero signal 343 is generated at a first output of the zero crossing comparator 341. If the same sample of the digital F2F signal 221 is greater than the zero value, then a greater than zero signal 346 is generated at a second output of the zero crossing comparator 341

The peak detector 223 also includes a first D flip-flop 351 and a second D flip-flop 353. The first D flip-flop 351 has a logical one applied to its input D and the more positive signal 233 is applied to its clocking input. The output Q of the first D flip-flop 351 is applied to the input D of the second D flip-flop 353. The less than zero signal 343 is applied to the clocking input of the second D flip-flop 353. The output Q of the second D flip-flop 353 is applied to an input of a zero crossing OR gate 356.

When the more positive signal 233 begins to pulse, a logical one is repeatedly latched into the first D flip-flop 351 until the more positive signal 233 ceases to pulse. At this point, a positive peak 135 has been reached and is stored in the positive peak register 309. A negative transition 130 follows and the less than zero signal 343 is set to a logical one when the digital F2F signal 121 crosses below the zero value. This causes the output of the first D flip-flop 351 to be latched into the second D flip-flop 353 and the output Q of the second D flip-flop 353 is applied to the input of the zero crossing OR gate 356.

The peak detector 223 also includes a third D flip-flop 359 and a fourth D flip-flop 363. The third D flip-flop 359 also has a logical one applied to its input D and its output Q is applied to the input D of the fourth D flip-flop 363. The more negative signal 235 is applied to the clocking input of the third D flip-flop 359 and the greater than zero signal 346 is applied to the clocking input of the fourth D flip-flop 363. Finally, the output Q of the fourth D flip-flop 363 is applied to a second input of the zero crossing OR gate 356.

The operation of the third and fourth D flip-flops 359 and 363 is similar to that of the first and second D flip-flops 351 and 353. That is to say, when the more negative signal 235 pulses, the logical one is repeatedly latched into the third D flip-flop 359 until a negative peak 140 is obtained and stored in negative peak register 329. Thereafter, the digital F2F signal 121 undergoes a positive transition 125 and, once the digital F2F signal 121 crosses the zero value, the greater than zero signal 346 is set to a logical one, thereby latching the output Q of the third D flip-flop 359 into the fourth D flip-flop 363. This logical one appears at the output Q of the fourth D flip-flop 363 and is applied to a second input of the zero crossing OR gate 356.

When a logical one is applied to either input of the zero crossing OR gate 356 by the second or fourth D flip-flops 353 or 363, then the zero crossing OR gate 356 generates the zero crossing signal 229 at its output. The zero crossing signal 229 is applied to a delay 366, and then to the clearing inputs of the positive and negative peak registers 309 and 329, and the first, second, third, and fourth D flip-flops 351, 353, 359, and 363.

Note that the output Q of the second D flip-flop 353 is also applied to a B selection input SB of a peak select multiplexer 373. Also, the output Q of the fourth D flip-flop 363 is applied to an A selection input SA of the peak select multiplexer 373. The positive peak value 313 is applied to a B input and the negative peak value 333 is applied to an A input of the peak select multiplexer 373. Thus, when the output Q of the second D flip-flop 353 is set to logical one, the peak select multiplexer 373 applies the positive peak value 313 to its output. Likewise, when the output Q of the fourth D flip-flop 363 is set to a logical one, the peak select multiplexer 373 applies the negative peak value 333 to its output.

Thereafter, the output of the peak select multiplexer 373 is applied to a peak register 376 that acquires the selected positive or negative peak value 313 or 333 when the zero crossing signal 229 is received at the latching input L of the peak register 376. Thus, the peak detector 223 outputs the positive peak value 313 or the negative peak value 333 from the peak register 376 upon the occurrence of a zero crossing after the respective negative or positive peak value 313 or 333 has been identified and stored in either the positive or negative peak registers 309 or 329. Thereafter, the peak detector 223 is reset by the application of the zero crossing signal 229 to the clearing inputs of the positive and negative peak registers 309 and 329, and the D flip-flops 351, 353, 359, and 363 to prepare for the detection of the next positive or negative peak 135 or 140.

Note that the peak detector 223 provides a distinct advantage in that it is not susceptible to data corruption due to the occurrence of hook and shelf waveforms 145 (FIG. 1). Specifically, the positive and negative peak values 313 and 333 are not provided to the peak register 376 until the zero crossing of the following transition, whether that transition is a negative or positive transition 125 or 130.

Figure 4:
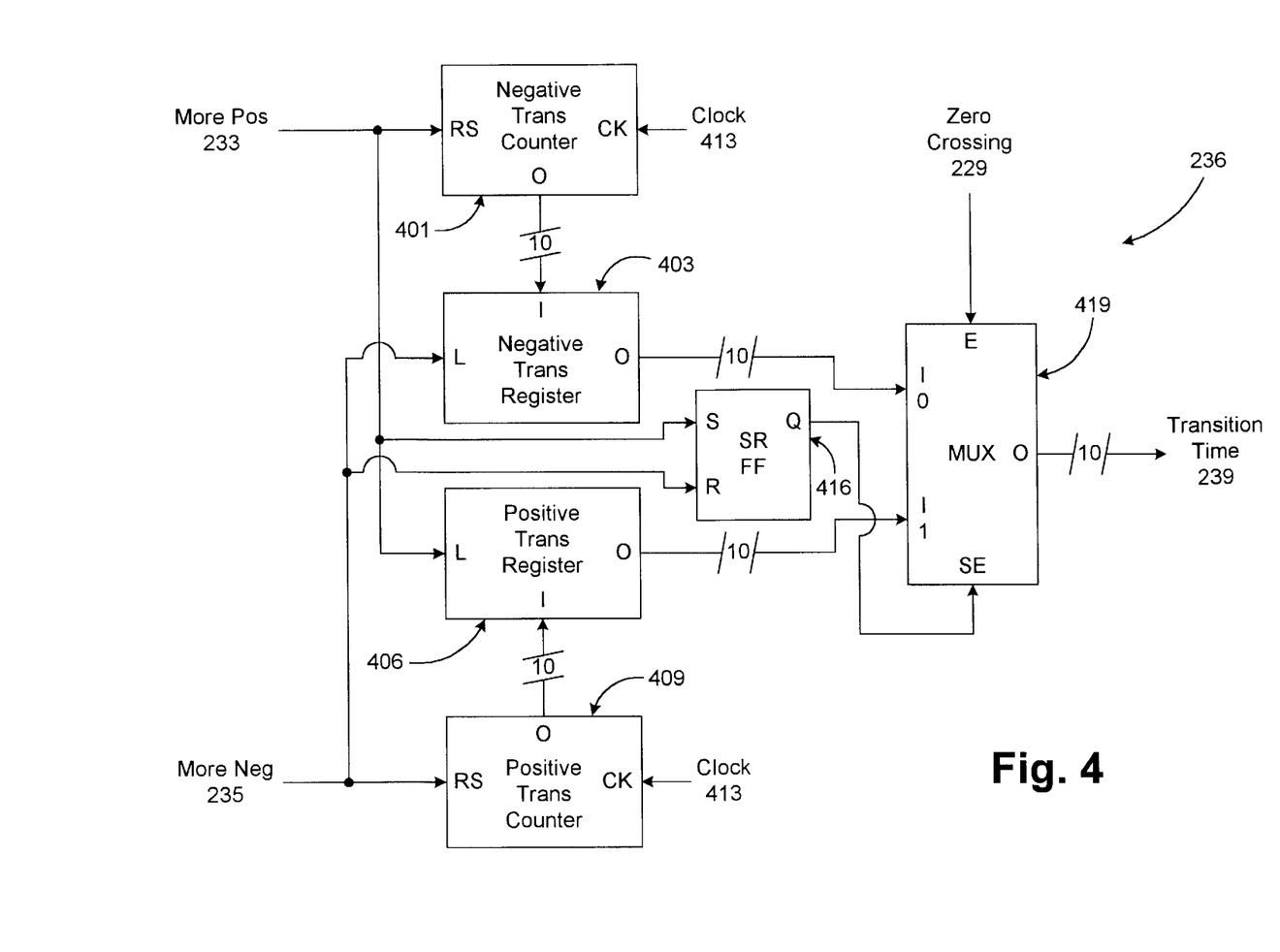
FIG. 4 is a schematic of a transition calculator employed by the magnetic read channel of FIG. 2 according to another embodiment of the present invention.

Referring next to FIG. 4, shown is a schematic of the transition calculator 236 according to an embodiment of the present invention. The transition calculator 236 includes both a negative transition counter 401 with a negative transition register 403 and a positive transition counter 409 with a positive transition register 406. The negative and positive transition counters 401 and 409 each have a reset input RS, a clock input CK, and a parallel output 0. The more positive signal 233 is applied to the reset input RS of the negative transition counter 401 and the more negative signal 235 is applied to the reset input RS of the positive transition counter 409. A high frequency clock 413 is applied to the clock inputs CK of both the negative and positive transition counters 401 and 409.

The negative and positive transition registers 403 and 406 each have a latching input L, a parallel input I, and a parallel output O. The more positive signal 233 is applied to the latching input L of the positive transition register 406 and the more negative signal 235 is applied to the latching input L of the negative transition register 403. The parallel output O of the negative transition counter 401 is applied to the parallel input I of the negative transition register 403, and the parallel output O of the positive transition counter 409 is applied to the parallel input I of the positive transition register 406.

The transition calculator 236 also includes a set/reset flip-flop (SRFF) 416 having a set input S, a reset input R, and an output Q. The more positive signal 233 is applied to the set input S and the more negative signal 235 is applied to the Reset input R.

Finally, the transition calculator 236 includes a multiplexer 419 with a first parallel input I0, a second parallel input I1, a Select input SE, an Enable input E, and a parallel output O. The parallel outputs O of the negative and positive transition registers 403 and 406 are applied to the first and second parallel inputs I0 and I1, respectively. The output Q of the SRFF 416 is applied to the Select input SE, and the zero crossing signal 229 is applied to the Enable input E of the multiplexer 419. The transition time 239 appears at the output O of the multiplexer 419.

The operation of the transition calculator 236 is as follows. Both the negative and positive transition counters 401 and 409 are set to count continuously. Assuming that the more positive signal 233 is pulsing as the digital F2F signal 221 (FIG. 2) approaches a positive peak 135 (FIG. 1), the negative transition counter 401 is reset by each more positive pulse until the final more positive signal pulse occurs, indicating that a positive peak 135 has been reached. At that point the negative transition counter 401 begins to count without interruption as a negative transition 130 is commenced. As the digital F2F signal progresses through the ensuing negative transition, the more negative signal 235 begins to pulse when the negative zero threshold 110 has been reached. The more negative pulses applied to the latching input L of the negative transition register 403 cause the current value of the negative transition counter 401 to be latched into the negative transition register 403. When the final more negative pulse occurs, indicating that a negative peak 140 has been reached, the value stored in the negative transition register 403 now equals negative transition time, or the time of the negative transition 130.

The application of the more negative pulses to the reset input R of the SRFF 416 result in a logical zero at the output Q that selects the first input I0 of the multiplexer 419. During the ensuing positive transition 125, the zero crossing signal 229 experiences a pulse which is applied to the Enable input E of the multiplexer 419 as the F2F signal 221 crosses zero and climbs toward a positive peak 135. The zero crossing pulse causes the negative transition time from the negative transition register 403 to be latched into the output of the multiplexer 419 which provides the negative transition time to the frequency locked loop 243.

The transition calculator 236 provides a positive transition time to the frequency locked loop 243 in the same manner. The pulses of the more negative signal 235 cause the positive transition counter 409 to be reset until a negative peak 140 is reached. Thereafter, the positive transition counter 409 counts during the ensuing positive transition 125. The pulses of the more positive signal 233 generated when the positive transition 125 approaches a positive peak 135 cause the ever increasing count stored in the positive transition counter 409 to the latched into the positive transition register 406. When the last pulse of the more positive signal 233 occurs, the time held in the positive transition register 406 is equal to the positive transition time.

The pulses of the more positive signal 233 also set the SRFF 416 that applies a logical one to the output Q. The logical one is applied to the selection input SE of the multiplexer 419, and, with an ensuing pulse of the zero crossing signal 229, the positive transition time is latched from the positive transition register 406 to the multiplexer output O and provided to the frequency locked loop 243.

The transition calculator 236 provides distinct advantages which include the fact that the transition time is more accurately calculated giving that the A/D converter 219 operates a very high sample rate. In addition, noise that exists around the zero point cannot affect the transition time.

Figure 5:
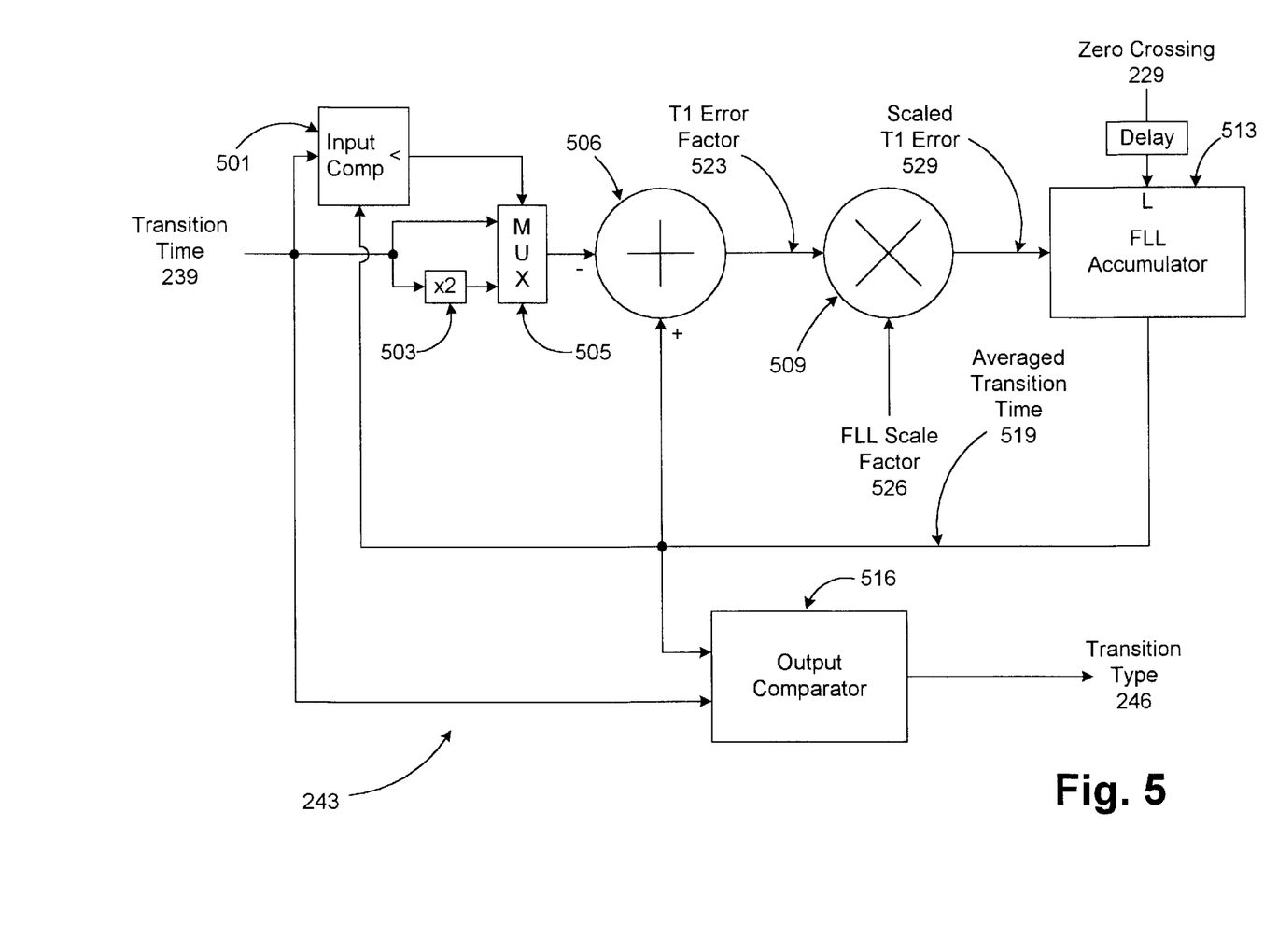
FIG. 5 is a functional block diagram of a frequency locked loop employed by the magnetic read channel of FIG. 2 according to another embodiment of the present invention.

With reference to FIG. 5, shown is a functional block diagram of the frequency locked loop (FLL) 243 according to another embodiment of the present invention. The frequency locked loop 243 comprises an FLL input comparator 501, a times two multiplier 503, a multiplexer 505, an adder 506, a scaling multiplier 509, an FLL accumulator 513, and a FLL output comparator 516. The transition time 239 is applied to both the FLL input comparator 501 and the FLL output comparator 516. The FLL input comparator 501 also receives an average transition time 519. If the transition time 239 is greater than a predetermined threshold, preferably 75% of the average transition time 519, then the FLL input comparator 501 outputs a logical zero which is applied to a selection input of the multiplexer 505. This applies the transition time 239 directly to the adder 506. If, on the other hand, the transition time 239 is less than or equal to the predetermined threshold, then the FLL input comparator 501 applies a logical one to the selection input of the multiplexer 505. In this case, a value equal to the transition time 239 multiplied by two in the times two multiplier 503 is applied to the adder 506.

Thereafter, the multiplied transition time 239 is applied to an inverted input of the adder 506. The average transition time 519 is also applied to the adder 506. The resulting function of the adder 506 generates a $T_1$ time period error 523 that is applied to the scaling multiplier 509. An FLL scaling factor that is a number less than one is also applied to the scaling multiplier 509. The resulting scaled $T_1$ time period error 529 is latched into the FLL accumulator 513 upon the application of the zero crossing signal 229 to the latching input of the FLL accumulator 513. The FLL accumulator 513 adds the scaled $T_1$ time period error 529 to the average transition time 519 and thereby adjusts the average transition time 519 accordingly. Note that the initial scaling factor 526 and initial average transition time 519 are determined by an automated reset function at start-up. These values may also be written from an external digital circuit, etc.

The average transition time 519 is also applied to the FLL output comparator 516 and the FLL output comparator 516 outputs a particular transition type 249. The transition type 249 indicates whether the particular transition is of a first transition type that is indicated by a logical zero, or a second transition type that is indicated by a logical one. In determining the precise transition type 249, the transition time 239 is compared to a predetermined percentage of the average transition time 519. If the transition time 239 is greater than the predetermine percentage, which is preferably 75%, then the transition type 249 is preferably a logical zero. If the transition time 239 is less than or equal to the predetermined percentage, then the transition type 249 is preferably a logical one.

The actual value chosen for the FLL scaling factor 526 is determined with keeping the following concepts in mind. First, it is circuit simplicity in that all the scaling factors are factors of two so that multiplications may be accomplished by shifting binary values. Secondly, the stability and bandwidth of the feedback loop must be taken into account as known by those skilled in the art.

Referring back to FIG. 2, the functionality of the data separator 249 according to an embodiment of the present invention is briefly discussed. The data separator 249 converts the transition types 246 generated by the frequency locked loop 243 into data values. The actual data rate is equal to the inverse of the time period $T_1$. The data separator 249 outputs a logical zero for every logical zero generated by the frequency locked loop 243. Also, the data separator 249 outputs a logical one for every two consecutive logical ones generated by the frequency locked loop 243.

Figure 6:
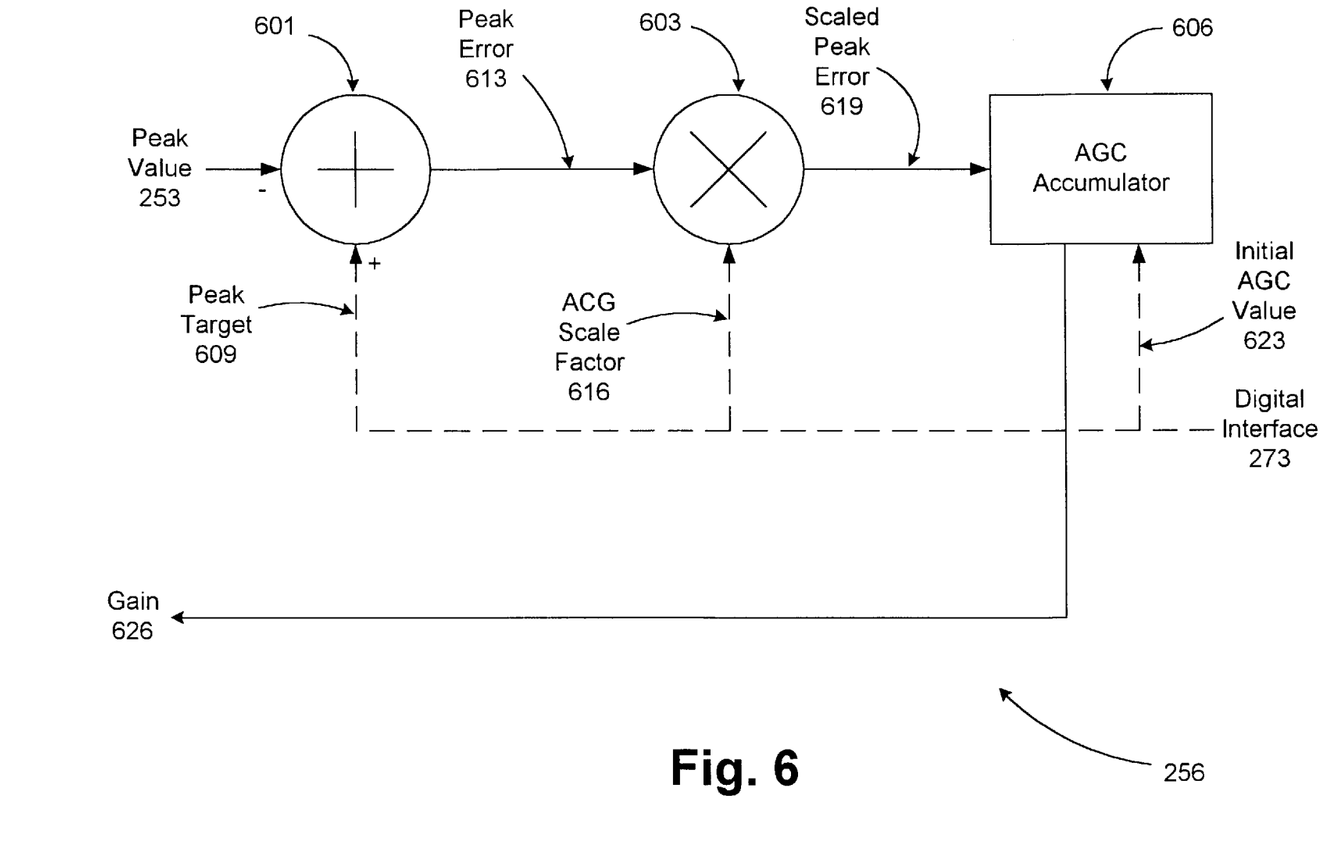
FIG. 6 is a functional block diagram of an automatic gain controller employed by the magnetic read channel of FIG. 2 according to another embodiment of the present invention.

With reference to FIG. 6, shown is a block diagram of the automatic gain controller (AGC) 256 according to another embodiment of the present invention. The automatic gain controller 256 comprises an AGC adder 601, an AGC multiplier 603, and an AGC accumulator 606. The AGC adder 601 receives an inverted peak value 253 and a predetermined peak target 609 from the digital interface 273. The output of the AGC adder 601 is a peak error 613 that is multiplied in the AGC multiplier 603 by a predetermined AGC scale factor 616 that is less than one and is supplied via the digital interface 273. The output of the AGC multiplier 603 is a scaled peak error 619 that is applied to the AGC accumulator 606. The AGC accumulator 606 adds the scaled peak error 619 to its existing value. At start-up, an initial AGC value 623 is applied to the AGC accumulator 606 via the digital interface 273. The output of the AGC accumulator 606 is a gain 626 that is applied to the D/A converter 263 (FIG. 1) and thereafter, to the variable gain amplifier 216 to control the magnitude of the F2F signal received from the continuous time filter 213 (FIG. 1). Specifically, the magnitude of the F2F signal 221 is kept within predetermined limits.

The peak target 609 is determined such that the values of the positive and negative peaks 135 and 140 received by the A/D converter 219 are in the middle of the operating range of the A/D converter 219. The initial AGC value 623 is specified so that a minimum detectable signal is received by the A/D converter 219. The AGC scale factor 616 the specified to ensure loop stability and to achieve a desirable loop bandwidth.

The AGC gain controller 256 is advantageous as it operates at the incoming data bit rate of the digital F2F signal 221 rather than in continuous time. This allows the AGC gain controller 256 to adapt to the data rate of the digital F2F signal 221 which varies with the speed in which the magnetic strip is passed along the magnetic read head 209.

Figure 7:
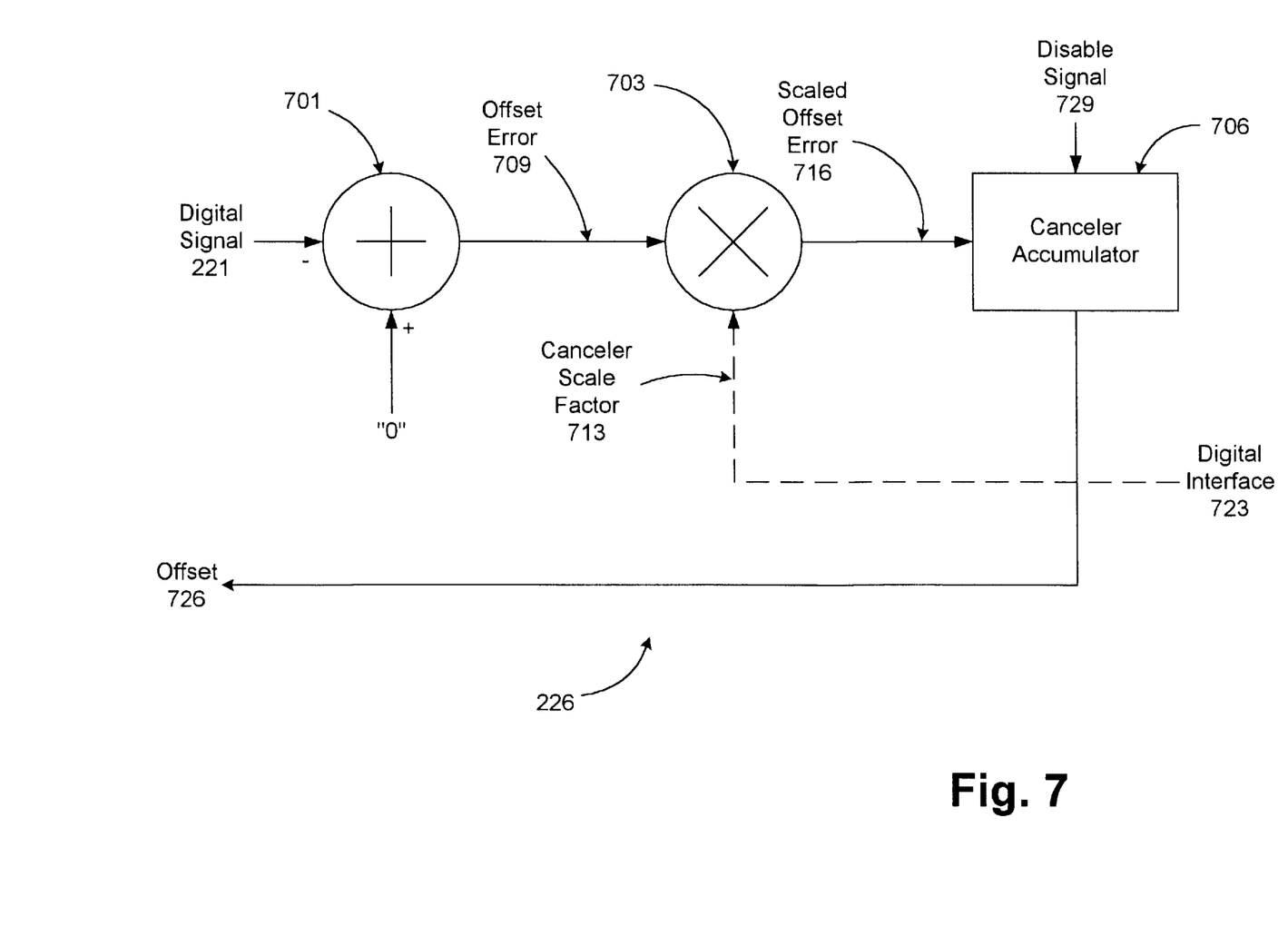
FIG. 7 is a functional block diagram of an offset canceler employed by the magnetic read channel of FIG. 2 according to yet another embodiment of the present invention.

Finally, turning to FIG. 7, shown is a block diagram of the offset canceler 226 according to another embodiment of the present invention. The offset canceler 226 includes offset adder 701, an offset multiplier 703, and an offset canceler accumulator 706. The offset adder 701 receives the digital F2F signal 221 at an inverting input and a hard coded zero. The result is an offset error 709 that is applied to the offset multiplier 703 and is multiplied by a predetermined canceler scale factor 713. The output of the offset multiplier 703 is a scaled offset error 716 that is applied to the offset canceler accumulator 706. The offset canceler accumulator 706 adds the scaled offset error 716 to the accumulated value stored therein. At start-up, the initial value held by the offset canceler accumulator 706 to zero. The canceler scale factor 713 it is received, for example, from the digital interface 723, but may be hard coded as well. The accumulated value in the offset canceler accumulator 706 is the offset 726 that is applied to the D/A converter 269 (FIG. 1) and thereafter to the continuous time filter 213, The offset 726 serves to ensure that the F2F signal 221 received from the magnetic strip that is run against the magnetic read head 209 (FIG. 1) is properly centered at zero volts for proper operation of the magnetic read channel 200.

The offset canceler accumulator 706 also receives a disable signal 726 from the digital interface 723 when an F2F signal 221 is detected by the magnetic read channel 200. This prevents the offset canceler 226 from generating a signal offset from an actual F2F signal 221. In particular the disable signal 726 is generated for predetermined period of time when the input signal rises above the positive zero threshold 105 or falls below the negative zero threshold 110. If there are no data bits produced by the data separator 249 (FIG. 2) within the predetermined time period, then the disable signal 726 is turned off as the rise or fall of the input may be due to noise and not the received of an actual F2F signal. As long as data bits are produced however, disable signal 726 will remain activated.

Many variations and modifications may be made to the above-described embodiment(s) of the invention without departing substantially from the spirit and principles of the invention. All such modifications and variations are intended to be included herein within the scope of the present invention.

What is claimed is:

1. A system to determine a transition type in a digital two frequency coherent phase (F2F) signal, comprising:
   a peak detector configured to identify a number of alternating negative and positive peaks in the digital F2F signal;
   a transition calculator configured to determine a number of transition times, each of the transition times being a time between one of the positive and one of the negative peaks; and
   a frequency locked loop configured to determine a transition type for each of the transition times.

2. The system of claim 1, wherein the peak detector further comprises at least one comparator to identify the positive and negative peaks, the comparator detecting a transition reversal by comparing a current F2F signal sample with a previous F2F signal sample.

3. The system of claim 1, wherein the transition calculator further comprises:
   a positive transition counter that begins counting upon detecting a negative peak; and
   a negative transition counter that begins counting upon detecting a positive peak.

4. The system of claim 1, wherein the frequency locked loop further comprises an output comparator to determine a transition type for each of the positive and negative transitions by comparing the transition time determined for each of the positive and negative transitions with a predetermined zero transition time.

5. The system of claim 1, further comprising a data separator configured to generate a logical zero upon the occurrence of a single first transition type, and generate a logical one upon the occurrence of two consecutive second transition types.

6. The system of claim 2, wherein the peak detector determines a magnitude of the positive and negative peaks by maintaining a current F2F sample in at least one peak register upon detection of a transition reversal.

7. An integrated magnetic read channel, comprising:
   a magnetic reader circuit configured to generate an analog two frequency coherent phase (F2F) signal from a magnetic strip, the analog F2F signal comprising a number of alternating positive and negative peaks having a respective positive and negative transitions therebetween;
   an analog-to-digital converter configured to convert the analog F2F signal into a digital F2F signal;
   a peak detector configured to identify the alternating negative and positive peaks;
   a transition calculator configured to determine a transition time between each of the consecutively positioned alternating positive and negative peaks;
   a frequency locked loop configured to determine a transition type for each of the transition times; and
   a data separator configured to determine a number of data values from the transition types, the data values being part of a predetermined data sequence.

8. The magnetic read channel of claim 7, wherein the peak detector further comprises at least one comparator to identify the positive and negative peaks, the comparator detecting a transition reversal by comparing a current F2F signal sample with a previous F2F signal sample.

9. The magnetic read channel of claim 7, wherein the transition calculator further comprises:
   a positive transition counter that begins counting upon detecting a negative peak; and
   a negative transition counter that begins counting upon detecting a positive peak.

10. The magnetic read channel of claim 7, wherein the frequency locked loop further comprises an output comparator to determine a transition type for each of the positive and negative transitions by comparing the transition time determined for each of the positive and negative transitions with a predetermined the zero transition time.

11. The magnetic read channel of claim 7, wherein the data separator is further configured to generate a logical zero upon the occurrence of a single first transition type, and generate a logical one upon the occurrence of two consecutive second transition types.

12. The magnetic read channel of claim 7, further comprising an automatic gain controller to provide gain feedback to the magnetic reader circuit, the automatic gain controller operating at the incoming data bit rate, the incoming data bit rate being variable.

13. The magnetic read channel of claim 7, further comprising an offset canceler to provide an offset feedback to the magnetic reader circuit.

14. A method to determine a predefined data sequence encoded in a digital two frequency coherent phase (F2F) signal, comprising the steps of:

identifying a number of alternating negative and positive peaks in the digital F2F signal;

determining a transition time between the alternating positive and negative peaks;

determining a number of transition types, each of the transition types corresponding to one of the transition times; and determining a number of data values from the transition types, the data values creating the predefined data sequence.

15. The method of claim 14, wherein the step of identifying a number of alternating negative and positive peaks further comprises the step of detecting a transition reversal by comparing a current F2F signal sample with a previous F2F signal sample.

16. The method of claim 14, wherein the step of determining a transition time between the alternating positive and negative peaks further comprises the steps of:

counting with a positive transition counter upon detecting a negative peak; and counting with a negative transition counter upon detecting a positive peak.

17. The method of claim 14, wherein the step of determining a transition type for each of the transition times further comprises the step of comparing the transition time determined for each of the positive and negative transitions with a predetermined the zero transition time.

18. The method of claim 14, wherein the step of determining a data value from the transition types further comprises the step of generating a logical zero upon the occurrence of a single first transition type, and generate a logical one upon the occurrence of two consecutive second transition types.

* * * * *